US011861772B2

(12) United States Patent
Chopra et al.

(10) Patent No.: US 11,861,772 B2
(45) Date of Patent: Jan. 2, 2024

(54) GENERATING IMAGES FOR VIRTUAL TRY-ON AND POSE TRANSFER

(71) Applicant: Adobe Inc., San Jose, CA (US)

(72) Inventors: Ayush Chopra, Cambridge, MA (US); Rishabh Jain, Gurgaon (IN); Mayur Hemani, Noida (IN); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 67 days.

(21) Appl. No.: 17/678,237

(22) Filed: Feb. 23, 2022

(65) Prior Publication Data

US 2023/0267663 A1 Aug. 24, 2023

(51) Int. Cl.
*G06T 11/60* (2006.01)
*G06N 3/045* (2023.01)
*G06T 7/11* (2017.01)
*G06T 7/70* (2017.01)
*G06N 3/044* (2023.01)
*G06N 3/08* (2023.01)

(52) U.S. Cl.
CPC ............ *G06T 11/60* (2013.01); *G06N 3/045* (2023.01); *G06T 7/11* (2017.01); *G06T 7/70* (2017.01)

(58) Field of Classification Search
CPC ............ G06F 2111/18; G06F 3/0481; G06F 3/04817; G06F 9/4443; G06F 3/04847; G06F 11/3664; G06F 3/012; G06F 3/0304; G06F 3/011–015; G06V 20/20; G06T 19/00; G06T 17/00; G06T 7/00; G06T 19/006; G06T 2215/16; H04N 5/272; H04N 2201/3245; A63F 13/10; G02B 27/017
See application file for complete search history.

(56) References Cited

U.S. PATENT DOCUMENTS

2021/0065418 A1* 3/2021 Han .................... G06T 7/73
2022/0258049 A1* 8/2022 Kanani ............ G06Q 30/0621

OTHER PUBLICATIONS

Ballas, Nicolas, et al., "Delving Deeper into Convolutional Networks for Learning Video Representations", Cornell University, arXiv Preprint, arxiv.org [retrieved Nov. 19, 2021]. Retrieved from the Internet <https://arxiv.org/pdf/1511.06432.pdf>., Nov. 2015, 11 Pages.

(Continued)

*Primary Examiner* — Todd Buttram
(74) *Attorney, Agent, or Firm* — FIG. 1 Patents

(57) ABSTRACT

In implementations of systems for generating images for virtual try-on and pose transfer, a computing device implements a generator system to receive input data describing a first digital image that depicts a person in a pose and a second digital image that depicts a garment. Candidate appearance flow maps are computed that warp the garment based on the pose at different pixel-block sizes using a first machine learning model. The generator system generates a warped garment image by combining the candidate appearance flow maps as an aggregate per-pixel displacement map using a convolutional gated recurrent network. A conditional segment mask is predicted that segments portions of a geometry of the person using a second machine learning model. The generator system outputs a digital image that depicts the person in the pose wearing the garment based on the warped garment image and the conditional segmentation mask using a third machine learning model.

20 Claims, 11 Drawing Sheets

(56) References Cited

OTHER PUBLICATIONS

Chopra, Ayush, et al., "ZFlow: Gated Appearance Flow-Based Virtual Try-On With 3D Priors", Cornell University, arXiv Preprint, arxiv.org [retrieved Nov. 19, 2021]. Retrieved from the Internet <https://arxiv.org/pdf/2109.07001.pdf>., Sep. 2021, 10 Pages.

Chopra, Ayush, et al., "Zflow: Gated Appearance Flow-based Virtual Try-on with 3D Priors Supplementary Material", Proceedings of the IEEE/CVF International Conference on Computer Vision (ICCV), 2021 [retrieved Feb. 17, 2022]. Retrieved from the Internet <https://openaccess.thecvf.com/content/ICCV2021/supplemental/Chopra_ZFlow_Gated_Appearance_ICCV_2021_supplemental.pdf>., Sep. 2021, 11 pages.

Güler, Riza Alp, et al., "DensePose: Dense Human Pose Estimation in the Wild", Cornell University, arXiv Preprint, arxiv.org [retrieved Nov. 19, 2021]. Retrieved from the Internet <https://arxiv.org/pdf/1802.00434.pdf>., Feb. 2018, 12 Pages.

Li, Yining, et al., "Dense Intrinsic Appearance Flow for Human Pose Transfer", Cornell University, arXiv Preprint, arxiv.org [retrieved Nov. 19, 2021]. Retrieved from the Internet <https://arxiv.org/pdf/1903.11326.pdf>., Mar. 2019, 17 Pages.

\* cited by examiner

GENERATING IMAGES FOR VIRTUAL TRY-ON AND POSE TRANSFER

BACKGROUND

A virtual try-on is facilitated by generating a photorealistic digital image that depicts a person in a pose wearing a particular garment based on a first input digital image that depicts the person in the pose wearing another garment and a second input digital image that depicts the particular garment. If the generated digital image accurately depicts the person in the pose wearing the particular garment (e.g., without artefacts), then the digital image is usable to evaluate how the person appears while wearing the particular garment. Thus, the generated digital image is leverageable to select the particular garment from a set of garments (e.g., the person is aesthetically pleasing when wearing the particular garment) and/or to select the person from a set of people (e.g., the particular garment is aesthetically pleasing when worn by the person).

Conventional systems for virtual try-on are not capable of generating the digital image as accurately depicting the person in the pose wearing the particular garment in scenarios involving complex poses of the person (e.g., self-occlusion) or that require significant geometric deformation of the particular garment. For instance, digital images generated using conventional systems in these scenarios include significant textural artefacts and/or depict the person with missing body parts (or additional body parts). The textural artefacts are caused by over deformation of the particular garment and the missing body parts are a result of the limited ability of conventional systems to accurately predict three-dimensional geometries (e.g., body-part ordering) based on two-dimensional digital images.

SUMMARY

Techniques and systems are described for generating images for virtual try-on and pose transfer. In an example, a computing device implements a generator system to receive input data describing a first digital image and a second digital image. The first digital image depicts a person in a pose and the second digital image depicts a garment.

For example, the generator system computes a hierarchy of displacement maps, each known as a candidate appearance flow map, to warp the garment based on the pose at different pixel-block sizes using a first machine learning model (e.g., a first convolutional network). A warped garment image is generated by combining the candidate appearance flow maps as an aggregate per-pixel displacement map using a convolutional gated recurrent network. For instance, the aggregate per-pixel displacement map warps pixels depicting portions of the garment to align with the pose.

In one example, a conditional segmentation mask is predicted that segments portions of a geometry of the person using a second machine learning model (e.g., a second convolutional network). The generator system generates a digital image using a third machine learning model (e.g., a third convolutional network) based on the warped garment image and the conditional segmentation mask. The digital image depicts the person in the pose wearing the garment.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 8 illustrates a representation of example images generated for virtual try-on.

DETAILED DESCRIPTION

Overview

Figure 1:
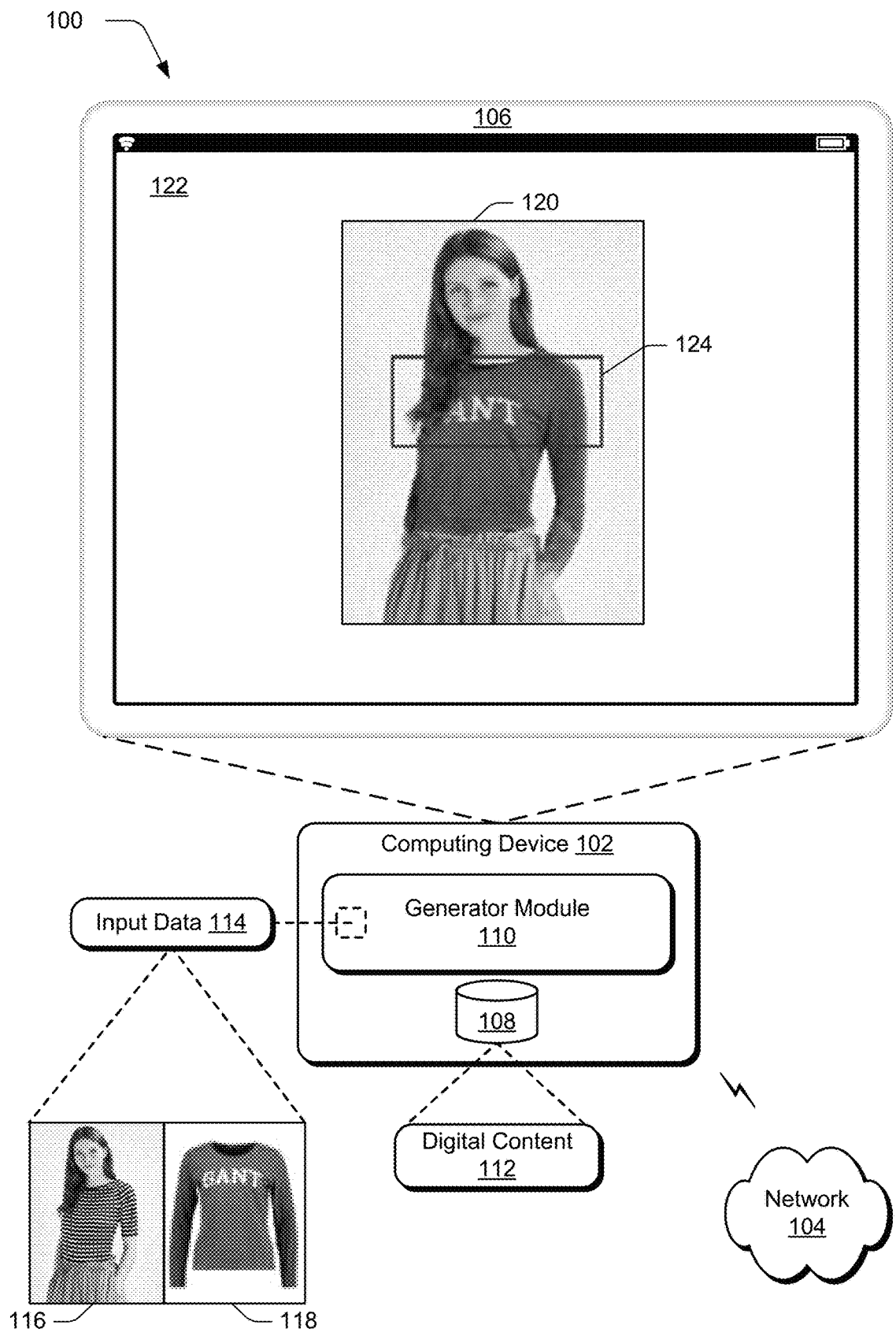
FIG. 1 is an illustration of an environment in an example implementation that is operable to employ digital systems and techniques for generating images for virtual try on and pose transfer as described herein.

A virtual garment try-on is performed by generating a photorealistic digital image that depicts a person in a pose wearing a garment based on a first digital image that depicts the person in the pose wearing another garment and a second digital image that depicts the garment. Conventional systems for virtual try-on are not capable of accurately generating the digital image in scenarios involving complex poses of the person or that require significant geometric deformation of the garment. For example, digital images generated using conventional systems in these scenarios include significant textural artefacts and/or depict the person with missing (or additional) body parts. The textural artefacts are a consequence of a lack of adequate regularization which causes over-deformation of the garment. The missing (or additional) body parts are a result of the limited ability of conventional systems to accurately incorporate three-dimensional geometric information (e.g., body-part ordering) based on the first and second digital images which are two-dimensional.

To overcome the limitations of conventional systems, techniques and systems are described for generating images for virtual try-on and pose transfer. In one example, a computing device implements a generator system to receive input data describing a first digital image that depicts a person in a pose wearing a first garment and a second digital image that depicts a second garment. The generator system generates prior data by processing the first digital image to encode the geometry of the person as a 1-channel body shape, an 18-channel pose map, a 3-channel head region, and a dense 11-channel body part segmentation. Once generated, the prior data describes the geometry of the person in the pose in a manner which is agnostic to (or independent of) the first garment depicted in the first digital image.

For example, the generator system processes the prior data and the second digital image using a first convolutional network to compute a hierarchy of candidate appearance flow maps that warp the second garment based on the pose at different pixel-block sizes (e.g., different scales). Each of the candidate appearance flow maps is a vector that indicates how to deform the second digital image to align with the pose of the person in the first digital image. The candidate appearance flow maps are combined as an aggregate per-pixel displacement map using a convolutional gated recurrent network.

For instance, the generator system implements the convolutional gated recurrent network to gate (allow or dismiss) the candidate appearance flow maps that correspond to different scales of view (e.g., based on the different pixel-block sizes). Gating the candidate appearance flow maps in this way prevents over warping of the second garment by regularizing high degrees of freedom in a dense per-pixel appearance flow. The generator system generates a warped garment image by warping the second digital image (e.g., the second garment) using the aggregate per-pixel displacement map.

The prior data and the second digital image are processed using a second convolutional network to predict a conditional segmentation mask. The conditional segmentation mask segments portions of the geometry of the person. For example, the conditional segmentation mask represents a clothing segmentation mask of the person in the pose conditioned or corrected based on the second garment. Accordingly, the conditional segmentation mask predicts a clothing segmentation of the person as it would be after the garment change try-on.

The generator system processes the warped garment image, the conditional segmentation mask, and additional prior data using a third convolutional network to generate a digital image that depicts the person in the pose wearing the second garment. The additional prior data describes a UV map of the person, a body-part segmentation mask of the person, and a texture translation prior. The texture translation prior describes pixels of the first digital image that do not depict a portion of the first garment (e.g., non-garment pixels). For instance, the UV map and the body-part segmentation mask of the person preserve structural and geometric integrity in the digital image such as depth-ordering, pose, skin and neckline reconstruction, etc.

The described systems are capable of accurately generating the digital image depicting the person in the pose wearing the second garment even in scenarios in which the pose is complex and the second garment requires significant warping or deformation. This is not possible using conventional systems that generate the digital image as depicting textual artefacts and/or the person having missing body parts. For example, a comparison of digital images generated using the described systems and digital images generated using conventional systems demonstrates that the described systems outperform the conventional systems based on multiple different metrics.

Furthermore, portions of the described systems are implementable to generate digital images for pose transfer which is also not possible using conventional systems for virtual try-on. A pose transfer system receives data describing a source digital image that depicts a person in a source pose and a target digital image that depicts the person (or another person) in a target pose, and the pose transfer system generates a digital image that depicts the person in the target pose. By computing candidate appearance flow maps and using the convolutional gated recurrent network for gated candidate appearance flow map aggregation, the described systems are capable of generating the digital image that depicts the person in the target pose with greater accuracy (e.g., fewer artefacts) than conventional systems for pose transfer. Thus, the described systems improve computer-based technology for both virtual try-on and pose transfer.

Term Examples

As used herein, the term "candidate appearance flow map" refers to a machine learning model generated vector that indicates how to reconstruct a target digital image using pixels of a source digital image. By way of example, for each target pixel of the target digital image, the vector specifies coordinate offsets of the source digital image where a pixel value is sampled to reconstruct the target pixel.

As used herein, the term "conditional segmentation mask" refers to a machine learning model generated mask that conditions or corrects a segmentation mask of a first digital image based on a second digital image. By way of example, the first digital image depicts a person in a pose wearing a first garment and the second digital image depicts a second garment. In this example, a conditional segmentation mask estimates a segmentation of the person in the pose wearing the second garment. By way of further example, the first garment is long-sleeved shirt and the second garment is a short-sleeved shirt. In this further example, the conditional segmentation mask estimates a segmentation of the person in the pose wearing the short-sleeved shirt. For example, the conditional segmentation mask conditions or corrects a segmentation mask of the person in the pose wearing the long-sleeved shirt based on the short-sleeved shirt.

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a generator module 110. The storage device 108 is illustrated to include digital content 112 such as digital photographs, digital images, digital videos, etc.

The generator module 110 is illustrated as having, receiving, and/or transmitting input data 114. The input data 114 describes a first digital image 116 that depicts a person in a pose. As shown, the person is a woman and the pose is front facing with a left arm visible and a right arm disposed behind the woman's back such that the right arm is not visible. The woman is wearing a first garment which has horizontal black and white stripes and mid-length sleeves that terminate above the woman's elbow. The input data 114 also describes a second digital image 118 that depicts a second garment. The second garment displays the letters "GANT" and has full-length sleeves.

The generator module 110 receives and processes the input data 114 to generate a digital image 120 which is rendered in a user interface 122 and depicts the person in the pose wearing the second garment. To do so in one example, the generator module 110 leverages prior data that describes clothing-agnostic (e.g., clothing-independent) structural priors of the person. For example, the generator module 110 generates the prior data using dense (e.g., 11-channel) body-part segmentation for the first digital image 116. In this example, the generator module 110 uses the dense body-part segmentation in addition to a conventional 1-channel body shape, 18-channel pose map, and 3-channel head region to provide richer structural priors. Accordingly, the prior data encodes a geometry of the person in the pose as depicted in the first digital image 116.

Continuing the previous example, the generator module 110 processes the prior data and the second digital image 118 using a first machine learning model (e.g., a first convolutional network) to compute candidate appearance flow maps that warp the second garment based on the pose. For example, the generator module 110 computes the candidate appearance flow maps at different pixel-block sizes using the first convolutional network. For instance, the generator module 110 interpolates the candidate appearance flow maps to have identical height and width.

The generator module 110 combines the candidate appearance flow maps as an aggregate per-pixel displacement map using a second machine learning model (e.g., a convolutional gated recurrent network). For example, the generator module 110 implements the convolutional gated recurrent network to gate (allow or dismiss) the candidate appearance flow maps that correspond to different radial neighborhoods (e.g., the different pixel-block sizes). This prevents over warping of the second garment by regularizing high degrees of freedom in a dense per-pixel appearance flow. Thus, the aggregate per-pixel displacement map warps pixels depicting portions of the second garment to align with the pose of the person.

In an example, the generator module 110 generates a warped garment image by warping the second garment using the aggregate per-pixel displacement map. For example, the generator module 110 also processes the prior data that describes the geometry of the person and the second digital image 118 using a third machine learning model (e.g., a second convolutional network) to predict a conditional segmentation mask. In this example, the conditional segmentation mask segments portions of the geometry of the person.

Notably, the prior data encodes the geometry of the person and is agnostic to the first garment that the person is wearing in the first digital image 116. This is important to prevent over-fitting as the pipeline is trained on paired data where the input and output are the same images (e.g., have the same segmentation mask). The generator module 110 trains the second convolutional network with a weighted cross-entropy loss with respect to a ground truth garment segmentation mask. The generator module 110 uses the trained second convolutional network to predict the conditional segmentation mask as corresponding to a clothing segmentation of the person after the garment change try-on.

The generator module 110 processes the warped garment image, the conditional segmentation mask, and additional prior data using a fourth machine learning model (e.g., a third convolutional network) to generate the digital image 120. The additional prior data describes a UV map of the person, a body-part segmentation mask of the person, and a texture translation prior. The texture translation prior represents pixels of the first digital image 116 that do not depict a portion of the first garment. For example, the texture translation prior describes non-garment pixels of the first digital image 116. The UV map and the body-part segmentation mask preserve geometric integrity (e.g., depth-ordering, pose, skin and neckline reconstruction, etc.) in the digital image 120. In one example, the UV map of the person and the body-part segmentation mask of the person are included in UV maps and body-part segmentation masks generated by the generator module 110 using a pre-trained network as described by Güler et al., *Densepose: Dense Human Pose Estimation in the Wild*, In Proceedings of the IEEE Conference on Computer Vision and Pattern Recognition, pp. 7297-7306, 2 (2018).

As shown, the digital image 120 is photorealistic and accurately depicts the person in the pose depicted in the first digital image 116 wearing the second garment depicted in the second digital image 118. A bounding box 124 bounds letters "ANT" of the letters "GANT" displayed on the second garment because the letter "G" is obscured by the woman's hair in the digital image 120. Further, the full-length sleeves of the second garment fully cover the woman's arms as depicted in the digital image 120 which are depicted as being partially exposed in the first digital image 116. In the digital image 120, the woman is front facing with a left arm visible and a right arm disposed behind the woman's back such that the right arm is not visible as the woman is depicted in the first digital image 116.

Since the generator module 110 is capable of accurately generating the digital image 120 as depicting the person in the pose wearing the second garment, the generator module 110 is usable to provide a variety of functionality. Consider an example in which a user of a client device determines a particular model included in a group of models to wear a particular garment at an event. In this example, the client device communicates data describing digital images of each model in the group and a digital image of the particular garment to the generator module 110 via the network 104. The generator module 110 generates a digital image for each model that depicts the model wearing the particular garment and communicates data describing the generated digital images to the client device via the network 104. The client device receives the data describing the generated digital images and the user of the client device determines the particular model based on the generated digital images.

Figure 2:
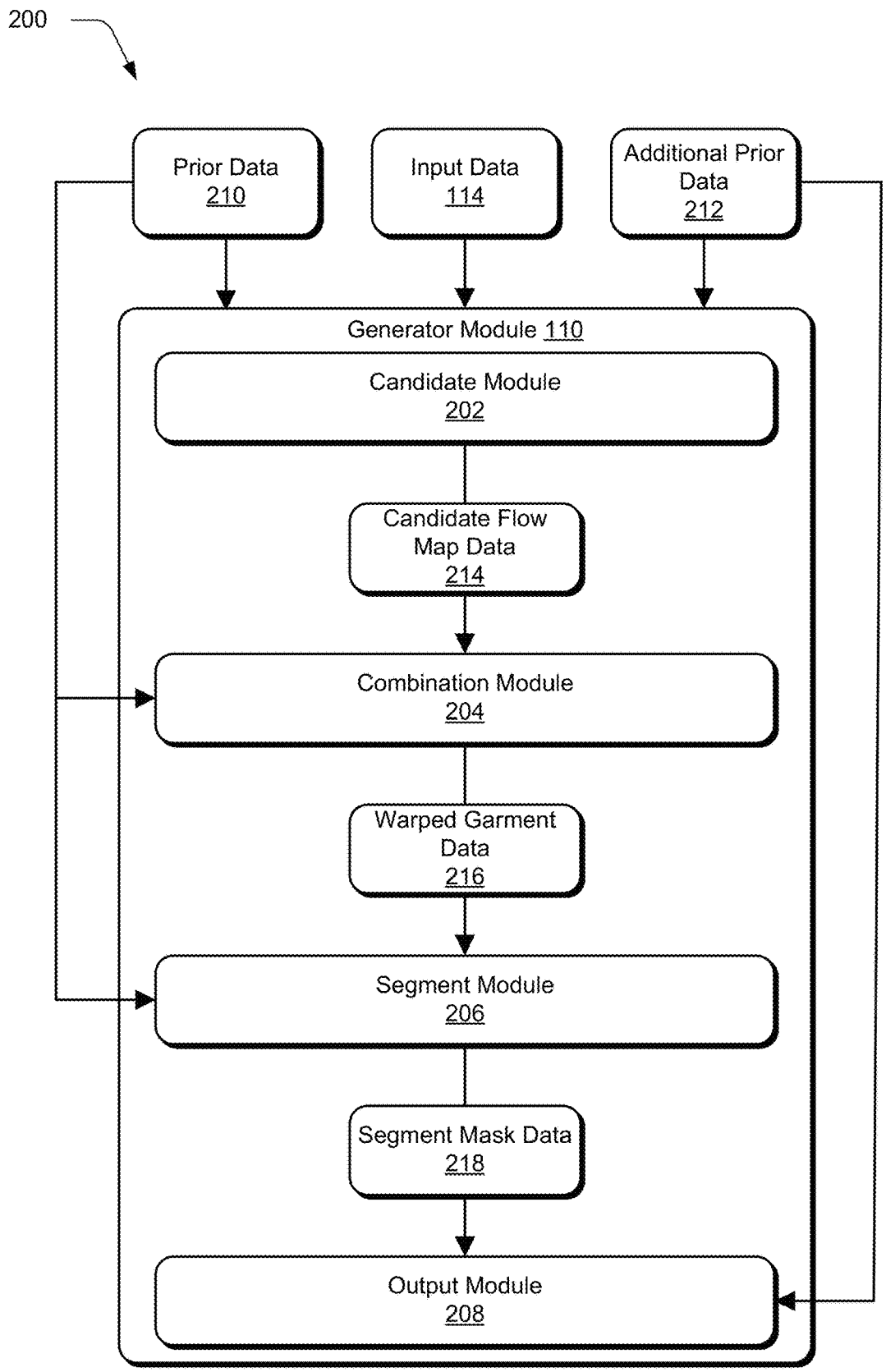
FIG. 2 depicts a system in an example implementation showing operation of a generator module for generating images for virtual try-on and pose transfer.

FIG. 2 depicts a system 200 in an example implementation showing operation of a generator module 110. The generator module 110 is illustrated to include a candidate module 202, a combination module 204, a segment module 206, and an output module 208. For example, the generator module 110 receives input data 114, prior data 210, and/or additional prior data 212 as inputs. In one example, the candidate module 202 processes the input data 114 and/or the prior data 210 to generate candidate flow map data 214.

Figure 3:
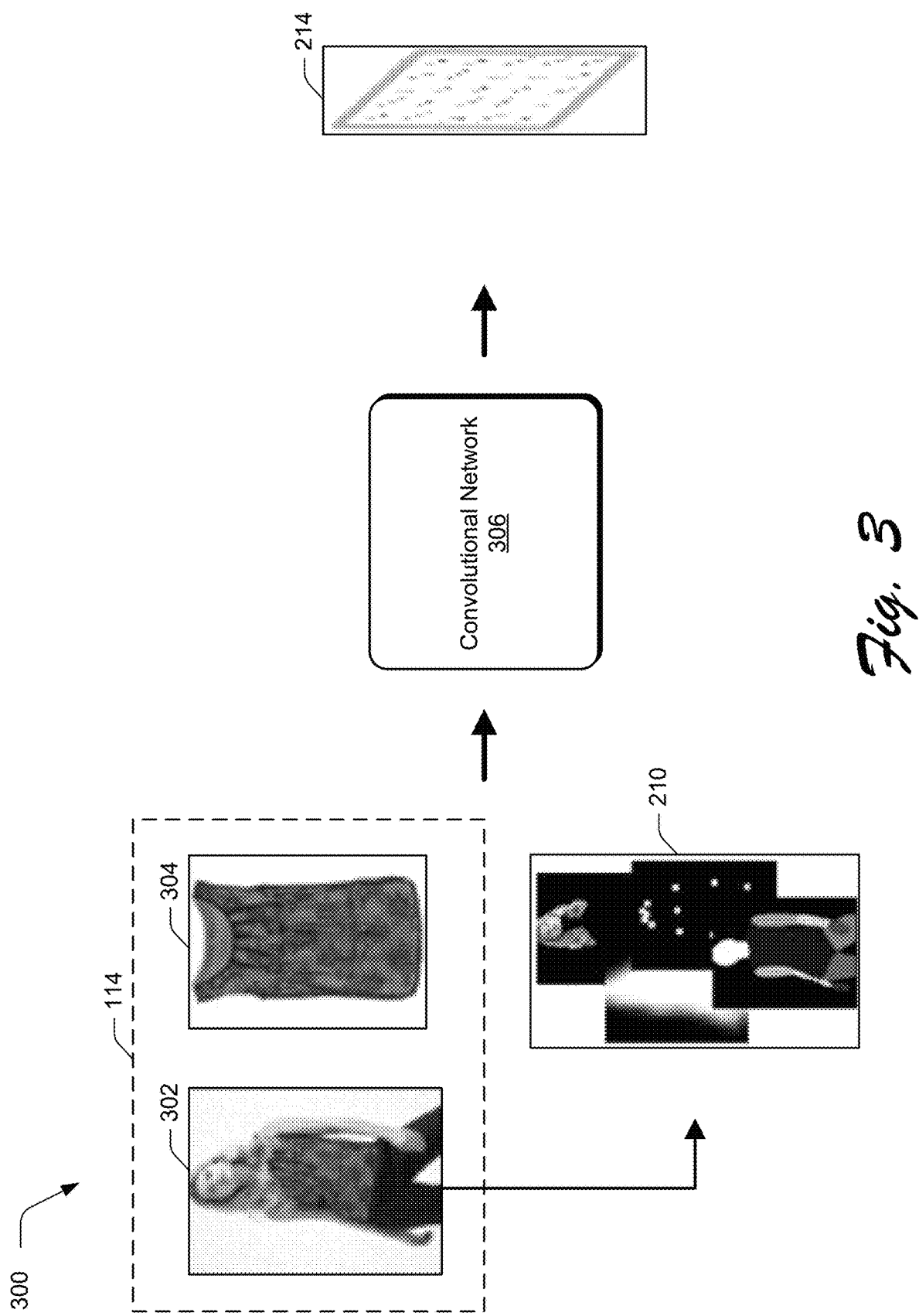
FIG. 3 illustrates a representation of computing candidate appearance flow maps.

FIG. 3 illustrates a representation 300 of computing candidate appearance flow maps. As shown, the candidate module 202 receives the input data 114 which describes a first digital image 302 that depicts a person in a pose and a second digital image 304 that depicts a garment. In one example, the second digital image 304 is directly representative of an isolated garment image $I_p$. In another example, the candidate module 202 generates the garment image $I_p$ using the second digital image 304, e.g., by segmenting pixels of the second digital image 304 that depict the garment and isolating the segmented pixels as the garment image $I_p$.

For example, the candidate module 202 also receives the prior data 210 which describes a geometry of the person depicted in the first digital image 302. In this example, the geometry of the person described by the prior data 210 is independent of or agnostic to garments worn by the person in the first digital image 302. For instance, the prior data 210 describes body-part segmentation masks that segment portions of the geometry of the person depicted in the first digital image 302.

In some examples, the candidate module 202 generates the prior data 210 because training data describing images depicting the person wearing different garments is unavailable. In these examples, the candidate module 202 extends a conventional binary (1-channel) body shape, (18-channel) pose map, and (3-channel) head region with an additional dense (11-channel) body-part segmentation of the first digital image 302 to provide improved structural priors relative to priors generated without the additional body-part segmentation of the first digital image 302. For example, the candidate module 202 processes the second digital image 304 (the garment image $I_p$) described by the input data 114 and the body-part segmentation masks described by the prior data 210 to compute candidate appearance flow maps that warp the garment image $I_p$ based on the pose at different pixel-block sizes.

In one example, the candidate module 202 includes a machine learning model such as a convolutional network 306 which the candidate module 202 implements to compute candidate appearance flow maps. For example, the convolutional network 306 is a 12-layer network as described by Ronneberger et al., U-net: Convolutional Networks for Biomedical Image Segmentation, CoRR, abs/1505.04597, 4, 5 (2015). In this example, given an input RGB image of size (H, W), the last K layers are used to predict the candidate appearance flow maps for ($f_l$ for $l \in \{0, \ldots, K\}$) such that a predicted candidate appearance flow map $f_l$ is double the size of candidate appearance flow map $f_{l-1}$. The predicted candidate appearance flow maps are interpolated to have identical height and width (H, W) which generates a pyramid of K candidate appearance flow maps that correspond to a structural hierarchy. As illustrated in FIG. 3, the candidate module 202 generates the candidate flow map data 214 as describing the computed candidate appearance flow maps that warp the garment at the different scales (e.g., the different pixel-block sizes).

Figure 4:
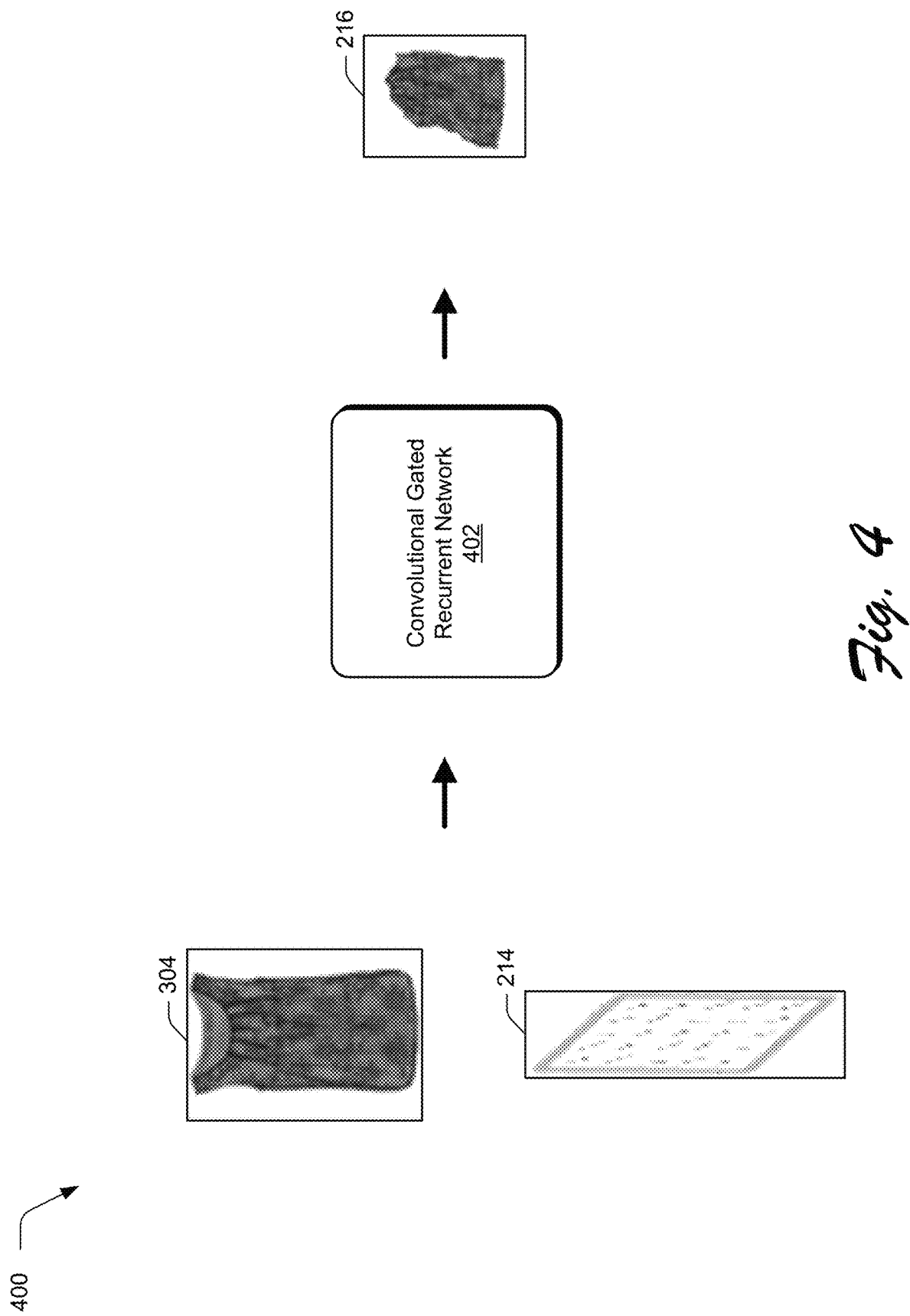
FIG. 4 illustrates a representation of generating a warped garment image.

For instance, the combination module 204 receives the candidate flow map data 214 and/or the prior data 210 and the combination module 204 processes the candidate flow map data 214 and/or the prior data 210 to generate warped garment data 216. FIG. 4 illustrates a representation 400 of generating a warped garment image $I_{wrp}$. As illustrated, the representation 400 includes the candidate flow map data 214 and the second digital image 304 (the garment image $I_p$) described by the input data 114. In one example, the combination module 204 includes a machine learning model such as a convolutional gated recurrent network 402. In this example, the convolutional gated recurrent network 402 is a network as described by Siam et al., *Convolutional Gated Recurrent Networks for Video Segmentation*, arXiv: 1611.05435v2 [cs.CV] 21 Nov. 2016.

The combination module 204 processes the candidate flow map data 214 and/or the input data 114 using the convolutional gated recurrent network 402 to combine the candidate appearance flow maps as an aggregate per-pixel displacement map that warps pixels depicting portions of the garment to align with the pose of the person. For example, the pose of the person is described by the geometry of the person encoded in the prior data 210. In this example, the combination module 204 generates the aggregate per-pixel displacement map by implementing the convolutional gated recurrent network 402 to perform a per-pixel selection process that gates (e.g., allows or dismisses) pixel flow estimates corresponding to different radial neighborhoods (e.g., for the different scales or the different pixel-block sizes). This prevents over-warping of the garment by regularizing high degrees of freedom in dense per-pixel appearance flow.

As illustrated in the representation 400, the combination module 204 uses the aggregate per-pixel displacement map to generate the warped garment image $I_{wrp}$. To do so in one example, the combination module 204 uses the aggregate per-pixel displacement map to warp the garment image $I_p$ and a mask $M_p$ to generate the warped garment image $I_{wrp}$ and a warped binary garment mask $M_{wrp}$, respectively. Additionally, intermediate flow maps $f_l$ for $l \in \{0, \ldots, K\}$ are used to produce intermediate warped images $I_{wrp}^l$ and intermediate warped masks $M_{wrp}^l$. Each of the warped images (final and intermediate) are subject to an L1 loss and a perceptual similarity loss with respect to garment regions of the first digital image 302. Each predicted warped mask is subject to a reconstruction loss with respect to a ground truth mask. The predicted flow maps are subjected to a total variation loss to ensure spatial smoothness of flow predictions. As shown, pixels depicting the garment in the second digital image 304 are displaced to align with the pose of the person to generate the warped garment image $I_{wrp}$. For example, the combination module 204 generates the warped garment data 216 as describing the warped garment image $I_{wrp}$.

Figure 5:
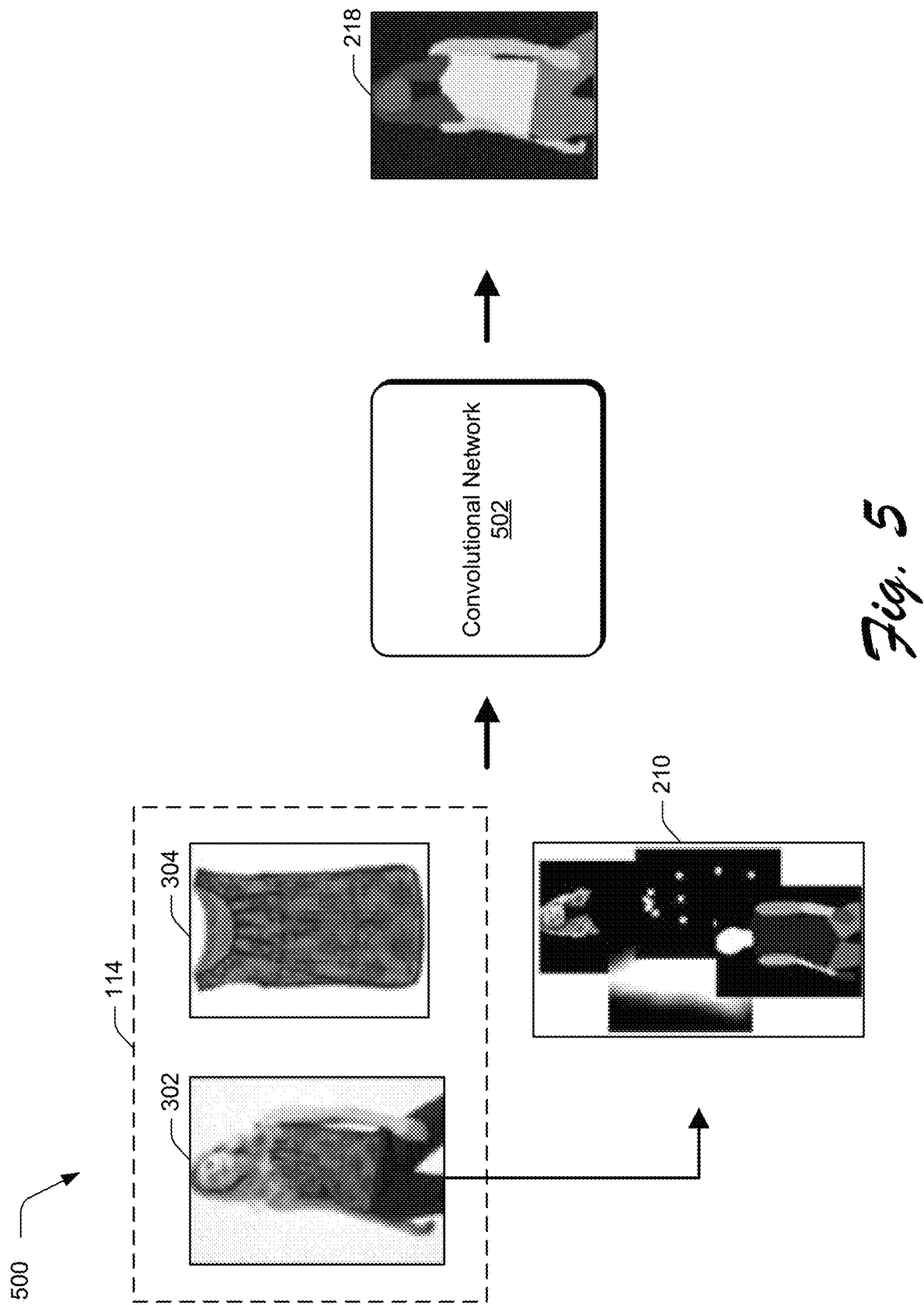
FIG. 5 illustrates a representation of predicting a conditional segmentation mask.

The segment module 206 is illustrated as receiving the warped garment data 216 which includes the input data 114 in some examples. The segment module 206 also receives the prior data 210 and the segment module 206 processes the prior data 210 and/or the input data 114 to generate segment mask data 218. FIG. 5 illustrates a representation 500 of predicting a conditional segmentation mask $M_{exp}$. The representation 500 includes the prior data 210 and the second digital image 304 (the garment image $I_p$) described by the input data 114.

For example, the segment module 206 includes a machine learning model such as a convolutional network 502 which the segment module 206 implements to process the second digital image 304 and the prior data 210 to predict the conditional segmentation mask $M_{exp}$. The prior data 210 encodes the geometry of the person in a manner that is independent and agnostic of garments worn by the person in the first digital image 302 which is important to prevent over-fitting as the pipeline is trained on paired data (e.g., where the input and output are the same images and hence have the same segmentation mask). The convolutional network 502 is trained with a weighted cross-entropy loss with respect to a ground truth garment segmentation mask ($M_s^{gt}$) obtained with a pre-trained human parser. A weight for a skin class and a background class is increased (e.g., 3.0) for improved handling of bleeding and self-occlusion for scenarios in which the pose of the person results in portions of the garment or person being hidden from view.

For instance, the conditional segmentation mask $M_{exp}$ segments portions of the geometry of the person described by the prior data 210. In an example, the conditional segmentation mask $M_{exp}$ is predicted as corresponding to clothing segmentation of the person after a virtual garment try-on (e.g., of the garment depicted in the second digital image 304). In this example, the convolutional network 502 includes six encoder layers and decoder layers and an output from the convolutional network 502 is a 7-channel conditional segmentation mask $M_{exp}$.

Figure 6:
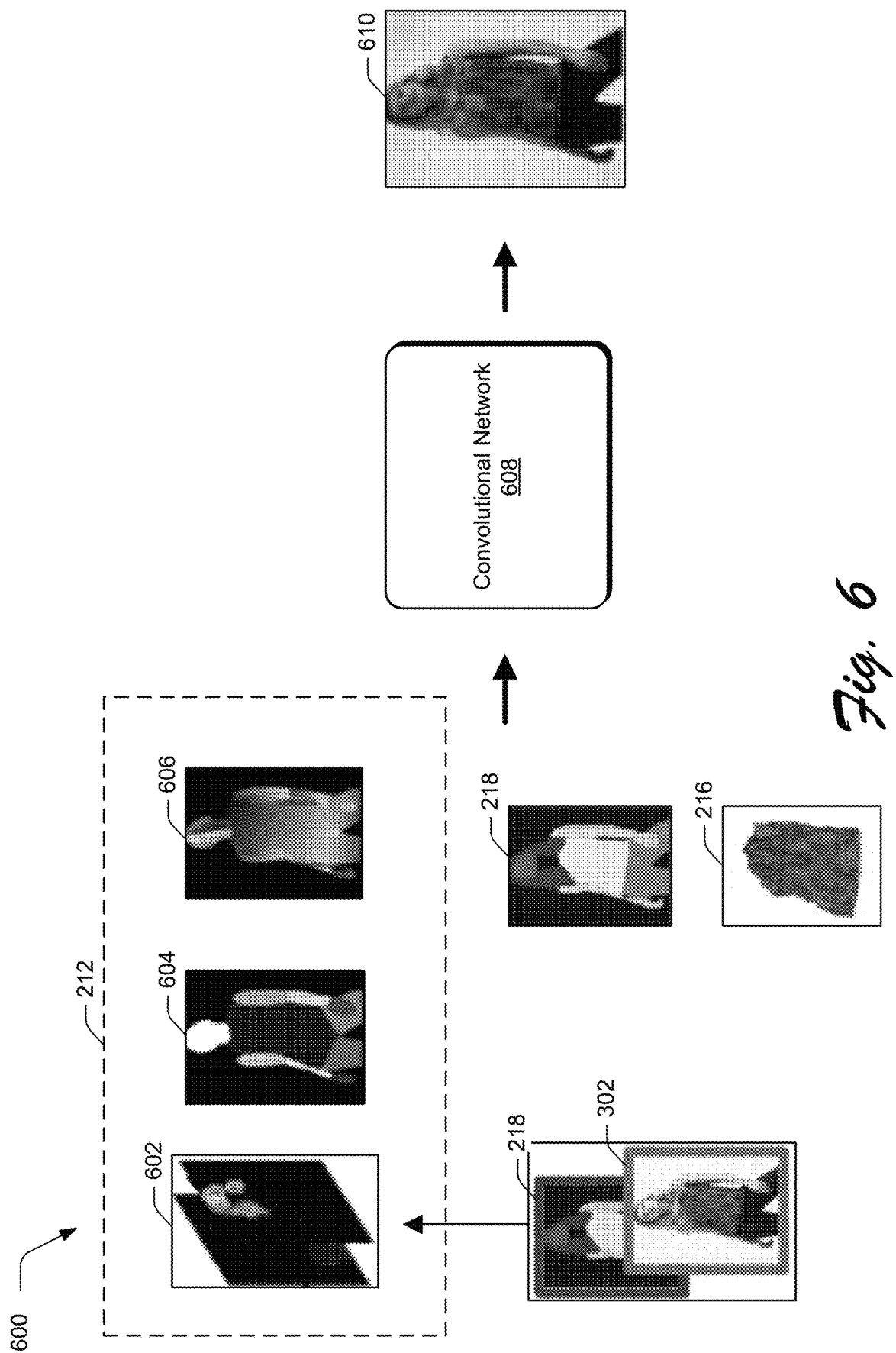
FIG. 6 illustrates a representation of outputting a digital image that depicts a person in a pose wearing a garment.

The segment module 206 generates the segment mask data 218 as describing the conditional segmentation mask $M_{exp}$. With reference to FIG. 2, the output module 208 receives the segment mask data 218 which includes the warped garment data 216 in some examples. For instance, the output module 208 also receives the additional prior data 212. FIG. 6 illustrates a representation 600 of outputting a digital image that depicts a person in a pose wearing a garment ($I_{tryon}$) The representation 600 includes the additional prior data 212 which describes a texture translation prior 602, a body-part segmentation mask 604 of the person, and a UV map 606 of the person.

The texture translation prior 602 represents pixels of the first digital image 302 that do not depict portions of a garment worn by the person in the image. Accordingly, the texture translation prior 602 describes non-garment pixels of the first digital image 302. For instance, the texture translation prior 602 is computed using the first digital image 302 and the conditional segmentation mask $M_{exp}$. The body-part segmentation mask 604 and the UV map 606 preserve geometric integrity of the pose, depth-ordering, skin and neckline reconstruction, and so forth.

In an example, the output module 208 includes a machine learning model such as a convolutional network 608 and the output module 208 implements the convolutional network 608 to generate a digital image 610 that depicts the person in the pose wearing the garment $I_{tryon}$. In this example, the convolutional network 608 includes six encoder and decoder layers and the convolutional network 608 processes the warped garment data 216, the segment mask data 218, and the additional prior data 212 to generate the digital image 610 that depicts the person in the pose wearing the garment $I_{tryon}$. For example, this is representable as:

$$I_{tryon} = M_{out} * I_{wrp} + (1 - M_{out}) * I_{rp}$$

where: $M_{out}$ is generated by the convolutional network 608 and is a composite mask for garment pixels in the try-on output; and $I_{rp}$ is generated by the convolutional network 608 and is a rendered person including all pixels depicting the person except the garment in the try-on output.

In order to preserve structural and geometric integrity of the try-on output, the convolutional network 608 is constrained to reconstruct input clothing segmentation (as $M_{exp}^{pred}$) and IUV priors (as $M_{bp}^{pred}$, $I_{uv}^{pred}$) which are unchanged. $I_{tryon}$ is subject to an L1 loss, a perceptual similarity loss, and an edge loss with respect to the first digital image 302. The edge loss is based on sobel filters and improves a quality of reproduced textures. Additionally $M_{exp}^{pred}$, $M_{bp}^{pred}$, and $I_{uv}^{pred}$ are subject to reconstruction losses against corresponding network inputs. The reconstruction loss combines cross-entropy loss for $M_{exp}^{pred}$, $M_{bp}^{pred}$ and smooth L1 loss for $I_{uv}^{pred}$.

As shown, the digital image 610 is photorealistic and accurately depicts the person in the pose depicted in the first digital image 302 wearing the garment depicted in the second digital image 304 (the garment image $I_p$). For instance, the digital image 610 accurately depicts depth such as a left hand in front of a left leg. In a self-occlusion example, the digital image 610 accurately depicts the person's right forearm behind the person and hidden from view.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 7:
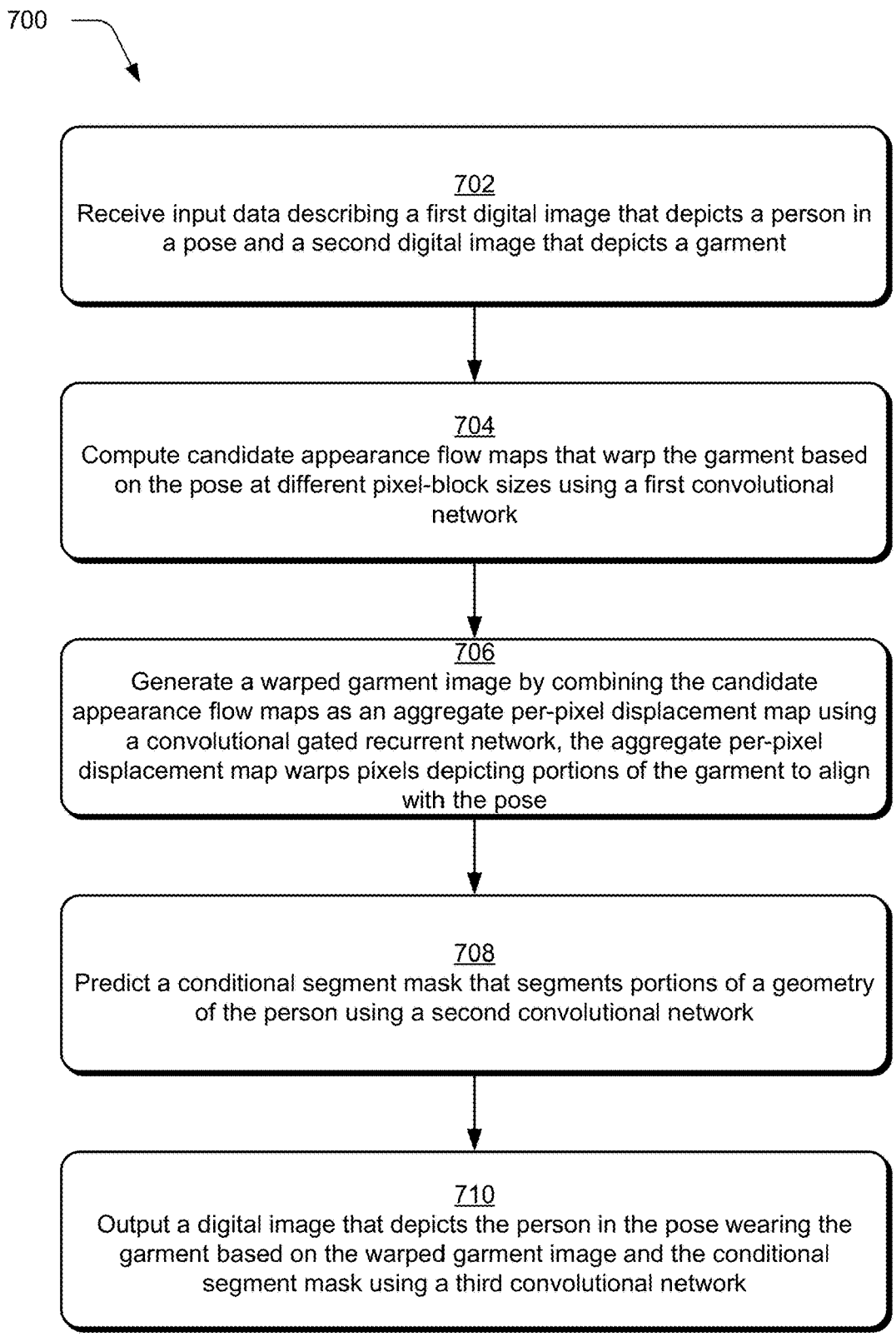
FIG. 7 is a flow diagram depicting a procedure in an example implementation in which input data is received describing a first digital image that depicts a person in a pose and a second digital image that depicts a garment and a digital image is output that depicts the person in the pose wearing the garment.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6. FIG. 7 is a flow diagram depicting a procedure 700 in an example implementation in which input data is received describing a first digital image that depicts a person in a pose and a second digital image that depicts a garment and a digital image is output that depicts the person in the pose wearing the garment.

Input data is received describing a first digital image that depicts a person in a pose and a second digital image that depicts a garment (block 702). In an example, the computing device 102 implements the generator module 110 to receive the input data. Candidate appearance flow maps that warp the garment based on the pose are computed at different pixel-block sizes using a first convolutional network (block 704). The generator module 110 computes the candidate appearance flow maps in some examples.

A warped garment image is generated (block 706) by combining the candidate appearance flow maps as an aggregate per-pixel displacement map using a convolutional gated recurrent network, the aggregate per-pixel displacement map warps pixels depicting portions of the garment to align with the pose. For example, the computing device 102 implements the generator module 110 to generate the warped garment image. A conditional segment mask is predicted (block 708) that segments portions of a geometry of the person using a second convolutional network. In one example, the generator module 110 predicts the conditional segment mask. A digital image is output (block 710) that depicts the person in the pose wearing the garment based on the warped garment image and the conditional segment mask using a third convolutional network.

Figure 8:
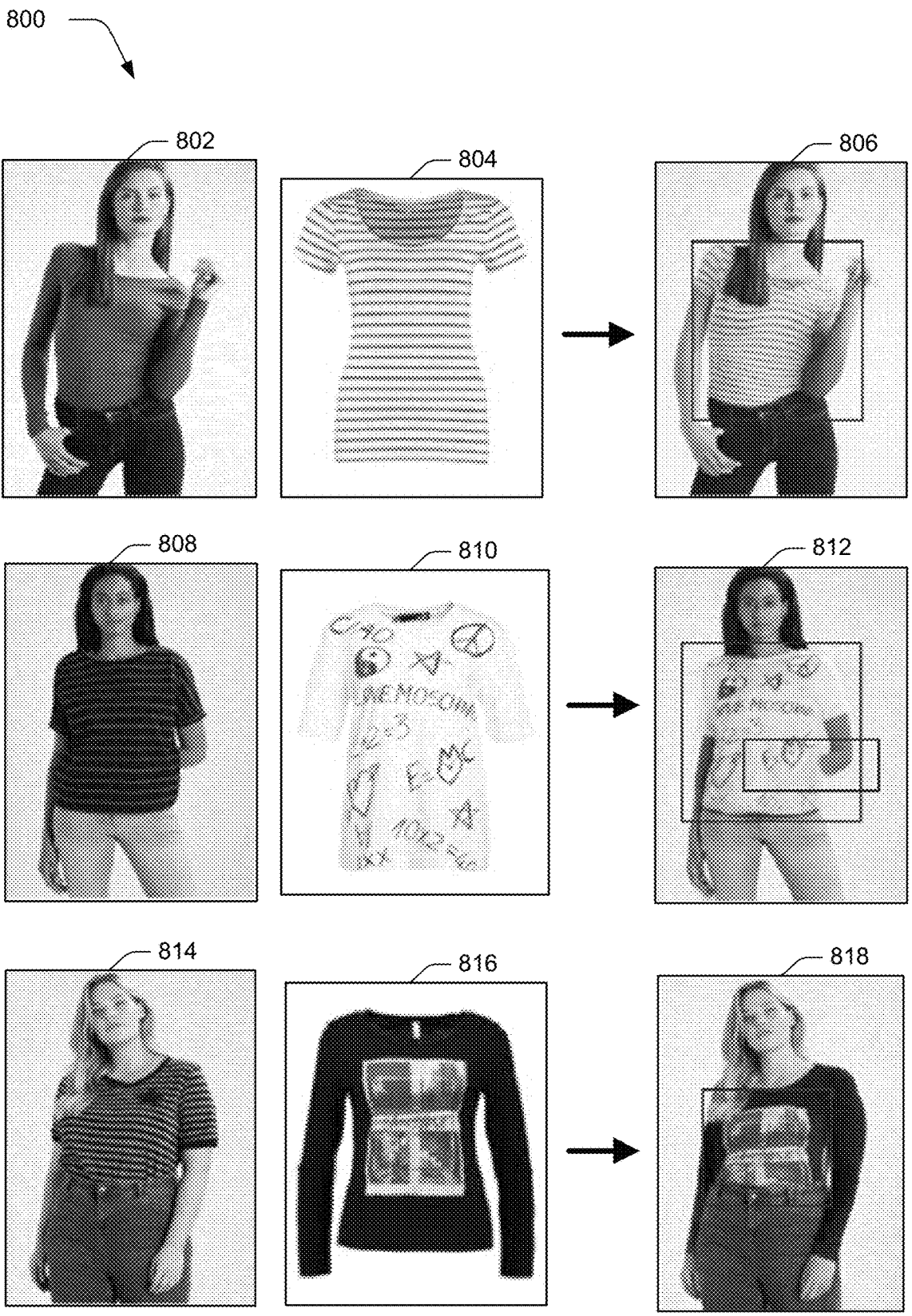

FIG. 8 illustrates a representation 800 of example images generated for virtual try-on. The representation 800 includes a digital image 802 that depicts a first person in a first pose. For instance, the first person is a first woman and the first pose is front facing with a right hand partially tucked in a front pants pocket and a left arm bent such that a left elbow is adjacent to a left hip of the first woman. In the digital image 802, the first woman is wearing a first garment which is a solid color and has full-length sleeves. The representation 800 also includes a digital image 804 that depicts a second garment. The second garment is short-sleeved and lightly colored with dark horizontal stripes.

In an example, the generator module 110 receives input data 114 describing the digital image 802 and the digital image 804 and the generator module 110 processes the input data 114 to generate a digital image 806. The digital image 806 depicts the first woman in the first pose wearing the second garment. As shown in the digital image 806, the first woman's arms are exposed and the dark horizontal stripes of the second garment have been warped to align with the first pose. For example, the generator module 110 warps pixels of the digital image 804 depicting portions of the dark horizontal stripes to align with the first pose based on the prior data 210 and the additional prior data 212 to generate the digital image 806.

The representation 800 also includes a digital image 808 that depicts a second person in a second pose. As shown, the second person is a second woman and the second pose is front facing with a right arm disposed at the second woman's side and a left arm disposed behind the second woman's back up to a left elbow of the left arm. In the digital image 808, the second woman is wearing a third garment that is short-sleeved and dark colored with thin light-colored horizontal stripes. A digital image 810 is included in the representation 800 that depicts a fourth garment. The fourth garment is short-sleeved and lightly colored with dark hand drawn designs. The dark designs are illustrated to include shapes, words, and mathematical equations.

In one example, the generator module 110 receives input data 114 describing the digital image 808 and the digital image 810. In this example, the generator module 110 processes the input data 114 to generate a digital image 812. The digital image 812 depicts the second woman in the second pose wearing the fourth garment. As shown in the digital image 812, the fourth garment includes the shapes, words, and mathematical equations.

For instance, the representation 800 includes a digital image 814 that depicts a third person in a third pose. The third person is a third woman and the third pose is front facing and similar to the second pose in that a right arm disposed at the third woman's right side. In the digital image 814, the third woman's left arm is along a left side with a left hand resting on the third woman's left thigh. The third woman is wearing a fifth garment which is short-sleeved and includes alternating light and dark colored horizontal stripes. A digital image 816 depicts a sixth garment. The sixth garment has full-length sleeves and is dark colored with a single photorealistic graphic disposed in a center of the sixth garment.

For example, the generator module 110 receives input data 114 describing the digital image 814 and the digital image 816. In this example, the generator module 110 processes the input data 114 to generate a digital image 818 that depicts the third woman in the third pose wearing the sixth garment. As shown in the digital image 818, the third woman's arms are covered by the full-length sleeves of the sixth garment. For instance, the photorealistic graphic is accurately reproduced in the digital image 818.

Figure 9:
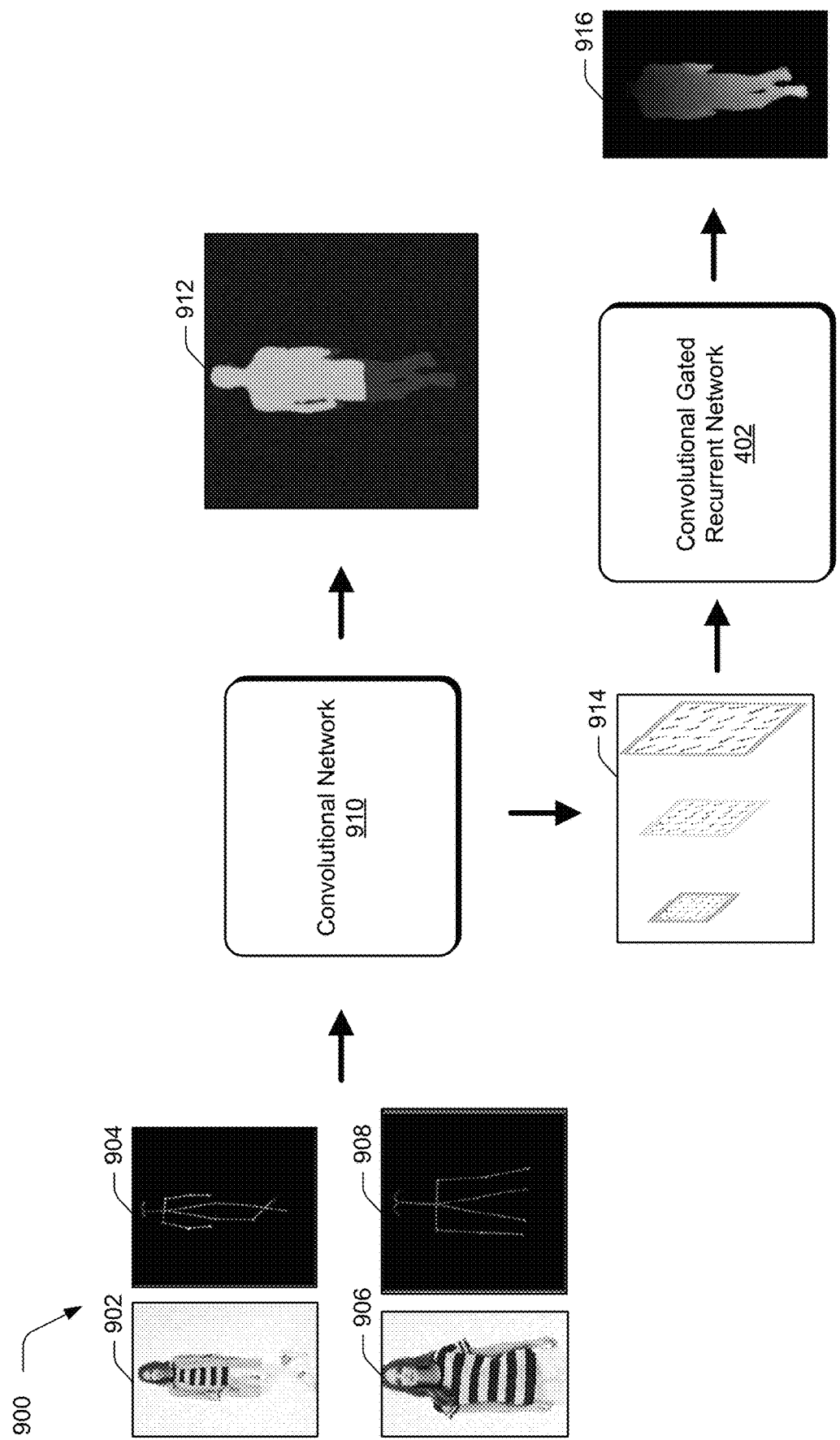
FIG. 9 illustrates a representation of a network for pose transfer.

FIG. 9 illustrates a representation 900 of a network for pose transfer. For an extended validation of the described system's efficacy for estimating appearance flows, portions of the described system are implemented for human pose transfer. For example, the network for pose transfer is a network as described by Li et al., *Dense Intrinsic Appearance Flow for Human Pose Transfer*, In Proceedings of the IEEE Conference on Computer Vision and Pattern Recognition, pages 3693-3702 (2019) with the convolutional gated recurrent network 402 used in place of three-dimensional flow regression. The task of human pose transfer generates an image of a person in a target pose based on a reference image. Unlike the virtual try-on task which warps a garment based on a pose of a person, the pose transfer task warps the pose of the person.

The representation 900 includes a first digital image 902 that depicts a person in a source pose 904 and a second digital image 906 that depicts the person in a target pose 908. The generator module 110 implements a convolutional network 910 to receive the first digital image 902 and the second digital image 906 as inputs and the convolutional network 910 processes the inputs to generate a visibility map 912 and candidate appearance flow maps 914. For instance, the visibility map 912 is generated using cross-entropy loss. The candidate appearance flow maps 914 each warp the person in the source pose 904 based on the target pose 908 at a different pixel-block size (e.g., a different scale).

The convolutional gated recurrent network 402 receives the candidate appearance flow maps 914 and aggregates the candidate appearance flow maps 914 as a flow map 916 with expected predicted error loss. The flow map 916 and the visibility map 912 are then used along with the first digital image 902 and the second digital image 906 to generate a digital image that depicts the person in the first digital image 902 in the target pose 908. The digital image that depicts the person in the first digital image 902 in the target pose 908 demonstrates significant improvements in skin generation and texture relative to conventional techniques for pose transfer.

Figure 10:
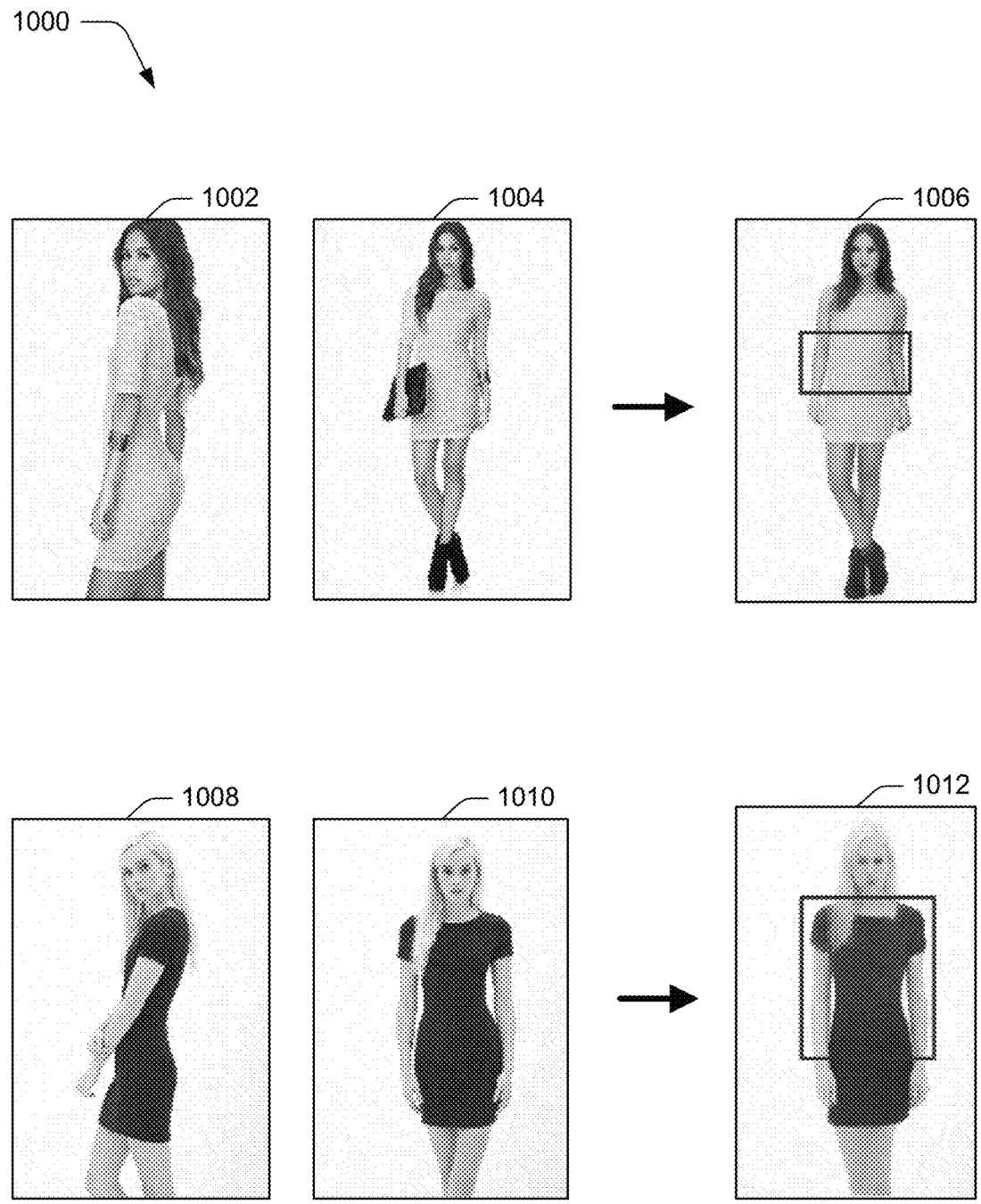
FIG. 10 illustrates a representation of example images generated for pose transfer.

FIG. 10 illustrates a representation 1000 of example images generated for pose transfer. As shown, the representation 1000 includes a digital image 1002 that depicts a source model and a digital image 1004 that depicts a target pose. The network for pose transfer processes the digital image 1002 and the digital image 1004 to generate a digital image 1006. As shown, the digital image 1006 depicts the source model in the target pose. The representation 1000 also include a digital image 1008 that depicts a source model and a digital image 1010 that depicts a target pose. The network for pose transfer processes the digital image 1008 and the digital image 1010 to generate a digital image 1012 that depicts the source model in the target pose.

Example Improvements

The described systems were evaluated against several conventional systems based on structural similarity index measure (SSIM), peak signal to nose ratio (PSNR), and Frechet inception distance (FID). Table 1 presents results of the evaluation.

TABLE 1

| System | SSIM | PSNR | FID |
| --- | --- | --- | --- |
| Conventional System 1 | 0.784 | 21.01 | 30.05 |
| Conventional System 2 | 0.837 | 23.52 | 26.67 |
| Conventional System 3 | 0.843 | 23.60 | 23.68 |
| Described Systems | 0.885 | 25.46 | 15.17 |

As shown in Table 1 above, the described systems outperform each of three conventional systems based on every metric evaluated. For instance, the SSIM of the described systems is greater than the SSIM of each of the three conventional systems, the PSNR of the described systems is greater than the PSNR of each of the three conventional systems, and the FID of the described systems is lower than the FID of each of the three conventional systems.

Example System and Device

Figure 11:
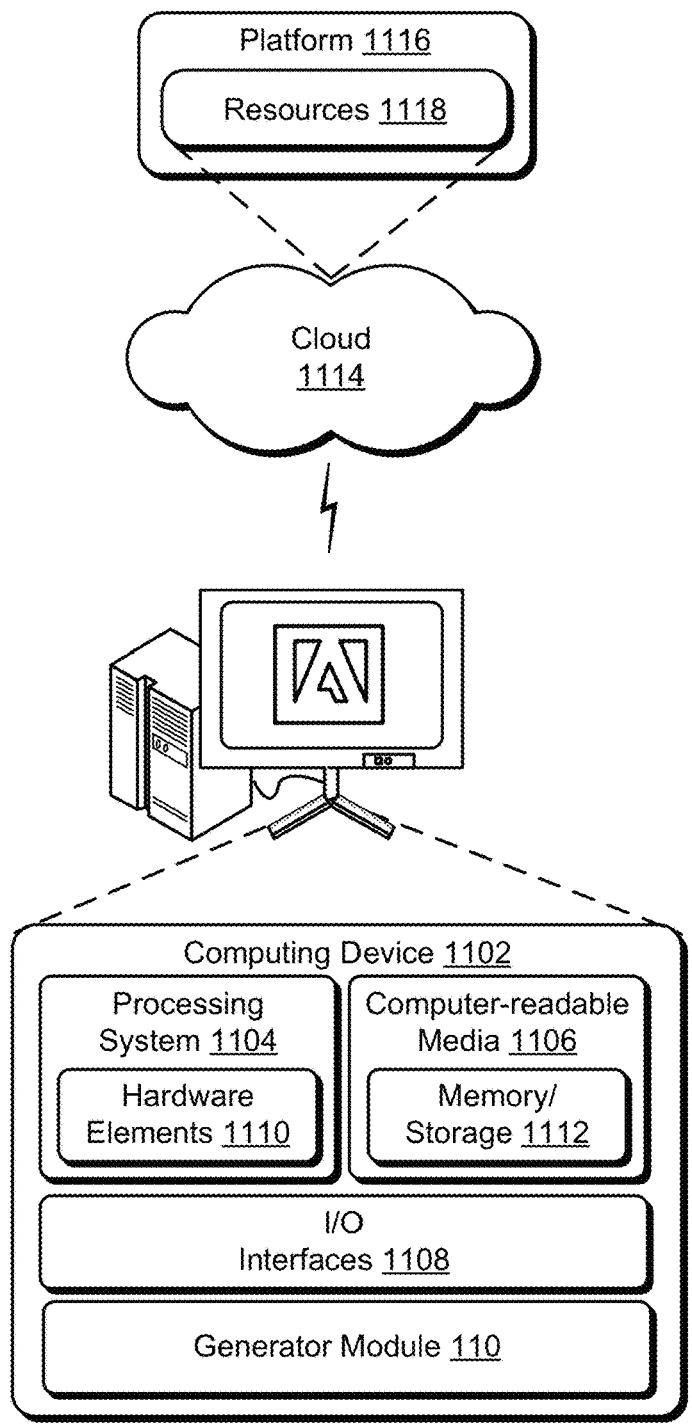
FIG. 11 illustrates an example system that includes an example computing device that is representative of one or more computing systems and/or devices for implementing the various techniques described herein.

FIG. 11 illustrates an example system 1100 that includes an example computing device that is representative of one or more computing systems and/or devices that are usable to implement the various techniques described herein. This is illustrated through inclusion of the generator module 110. The computing device 1102 includes, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, the computing device 1102 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that are configured as processors, functional blocks, and so forth. This includes example implementations in hardware as an application specific integrated circuit or other logic device formed using one or more semiconductors. The hardware elements 1110 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1106 is illustrated as including memory/storage 1112. The memory/storage 1112 represents memory/storage capacity associated with one or more computer-readable media. In one example, the memory/storage 1112 includes volatile media (such as random access memory (RAM)) and/or nonvolatile media (such as read only memory (ROM), Flash memory, optical disks, magnetic disks, and so forth). In another example, the memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1110. For example, the computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices 1102 and/or processing systems 1104) to implement techniques, modules, and examples described herein.

The techniques described herein are supportable by various configurations of the computing device 1102 and are not limited to the specific examples of the techniques described herein. This functionality is also implementable entirely or partially through use of a distributed system, such as over a "cloud" 1114 as described below.

The cloud 1114 includes and/or is representative of a platform 1116 for resources 1118. The platform 1116 abstracts underlying functionality of hardware (e.g., servers) and software resources of the cloud 1114. For example, the resources 1118 include applications and/or data that are utilized while computer processing is executed on servers that are remote from the computing device 1102. In some examples, the resources 1118 also include services provided over the Internet and/or through a subscriber network, such as a cellular or Wi-Fi network.

The platform 1116 abstracts the resources 1118 and functions to connect the computing device 1102 with other computing devices. In some examples, the platform 1116 also serves to abstract scaling of resources to provide a corresponding level of scale to encountered demand for the resources that are implemented via the platform. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

CONCLUSION

Although implementations of systems for generating images for virtual try-on and pose transfer have been described in language specific to structural features and/or methods, it is to be understood that the appended claims are not necessarily limited to the specific features or methods described. Rather, the specific features and methods are disclosed as example implementations of systems for generating images for virtual try-on and pose transfer, and other equivalent features and methods are intended to be within the scope of the appended claims. Further, various different examples are described and it is to be appreciated that each described example is implementable independently or in connection with one or more other described examples.

What is claimed is:

1. In a digital medium environment, a method implemented by a computing device, the method comprising:
receiving, by a candidate module, input data describing a first digital image that depicts a person in a pose and a second digital image that depicts a garment;
generating, by a generator module, prior data describing body-part segmentation masks, where the body-part segmentation masks segment portions of a geometry of the person in the pose in the first digital image independent of garments worn by the person;
computing, by the candidate module, candidate appearance flow maps that warp the garment based on the pose at different pixel-block sizes using a first machine learning model;
generating, by a combination module, a warped garment image by combining the candidate appearance flow maps as an aggregate per-pixel displacement map using a convolutional gated recurrent network, the aggregate per-pixel displacement map warps pixels depicting portions of the garment to align with the pose;
predicting, by a segment module, a conditional segmentation mask by processing the body-part segmentation masks described by the prior data and the second digital image using a second machine learning model, where the conditional segmentation mask segments portions of the geometry of the person and conditions the body-part segmentation masks based on the second digital image; and outputting, by an output module, a digital image that depicts the person in the pose wearing the garment based on the warped garment image and the conditional segmentation mask using a third machine learning model.

2. The method as described in claim 1, wherein the digital image is output at least partially based on additional prior data describing a UV map of the person and a body part segmentation mask of the person.

3. The method as described in claim 1, wherein the digital image is output at least partially based on additional prior data describing non-garment pixels of the first digital image via a texture translation prior.

4. The method as described in claim 1, wherein the second machine learning model is a convolutional network that is trained using a weighted cross-entropy loss with respect to a ground truth garment segmentation mask.

5. The method as described in claim 1, further comprising interpolating the candidate appearance flow maps such that each candidate appearance flow map has an identical height and an identical width relative to each other candidate appearance flow map.

6. The method as described in claim 1, wherein the first machine learning model is a first convolutional network, the second machine learning model is a second convolutional network, and the third machine learning model is a third convolutional network.

7. The method as described in claim 1, wherein generating, by the combination module, the warped garment image by combining the candidate appearance flow maps as the aggregate per-pixel displacement map using the convolutional gated recurrent network includes performing a per-pixel selection process via the convolutional gated recurrent network that gates pixel flow estimates corresponding to different radial neighborhoods.

8. The method as described in claim 1, wherein generating, by the generator module, the prior data describing the body-part segmentation masks includes processing the first digital image via the generator module to encode the geometry of the person in the pose as a 1-channel body shape, an 18-channel pose map, a 3-channel head region, and a dense 11-channel body-part segmentation.

9. The method as described in claim 1, further comprising:
receiving, by the generator module, a third digital image that depicts the person in a target pose; and
processing, by the generator module, the first digital image and the third digital image via the convolutional gated recurrent network to generate a visibility map and candidate appearance flow maps that warp the person in the pose from the first digital image based on the target pose.

10. A system comprising:
a candidate module implemented at least partially in hardware of a computing device to:
receive input data describing a first digital image that depicts a person in a pose and a second digital image that depicts a garment; and
compute candidate appearance flow maps that warp the garment based on the pose at different pixel-block sizes using a first convolutional network;

a generator module implemented at least partially in the hardware of the computing device to generate prior data describing body-part segmentation masks, where the body-part segmentation masks segment portions of a geometry of the person in the pose in the first digital image independent of garments worn by the person;

a combination module implemented at least partially in the hardware of the computing device to generate a warped garment image by combining the candidate appearance flow maps as an aggregate per-pixel displacement map using a convolutional gated recurrent network, the aggregate per-pixel displacement map warps pixels depicting portions of the garment to align with the pose;

a segment module implemented at least partially in the hardware of the computing device to predict a conditional segmentation mask by processing the body-part segmentation masks described by the prior data and the second digital image using a second convolutional network, where the conditional segmentation mask segments portions of the geometry of the person and conditions the body-part segmentation masks based on the second digital image; and an output module implemented at least partially in the hardware of the computing device to output a digital image depicting the person in the pose wearing the garment based on the warped garment image and the conditional segmentation mask using a third convolutional network.

11. The system as described in claim 10, wherein the conditional segmentation mask is predicted at least partially based on the prior data describing the body-part segmentation masks.

12. The system as described in claim 11, wherein the candidate appearance flow maps are computed at least partially based on the prior data.

13. The system as described in claim 10, wherein the digital image is output at least partially based on additional prior data describing a UV map of the person and the prior data describing the body-part segmentation masks.

14. The system as described in claim 10, wherein the digital image is output at least partially based on additional prior data describing non-garment pixels of the first digital image.

15. The system as described in claim 10, wherein the second convolutional network is trained using a weighted cross-entropy loss with respect to a ground truth garment segmentation mask.

16. One or more non-transitory computer-readable storage media comprising instructions stored thereon that, responsive to execution by a computing device, causes the computing device to perform operations including:
receiving input data describing a first digital image that depicts a person in a pose wearing a first garment and a second digital image that depicts a second garment;
generating prior data describing body-part segmentation masks, where the body-part segmentation masks segment portions of a geometry of the person in the pose in the first digital image independent of the first garment worn by the person;
computing candidate appearance flow maps that warp the second garment based on the pose at different pixel-block sizes using a first convolutional network;
generating a warped garment image by combining the candidate appearance flow maps as an aggregate per-pixel displacement map using a convolutional gated recurrent network, the aggregate per-pixel displacement map warps pixels depicting portions of the second garment to align with the pose;

predicting a conditional segmentation mask by processing the body-part segmentation masks described by the prior data and the second digital image using a second convolutional network, where the conditional segmentation mask segments portions of the geometry of the person and conditions the body-part segmentation masks based on the second digital image; and outputting a third digital image that depicts the person in the pose wearing the second garment based on the warped garment image and the conditional segmentation mask using a third convolutional network.

17. The one or more non-transitory computer-readable storage media as described in claim 16, wherein the third digital image is output at least partially based on additional prior data describing pixels of the first digital image that do not depict a portion of the first garment.

18. The one or more non-transitory computer-readable storage media as described in claim 16, wherein the third digital image is output at least partially based on additional prior data describing a UV map of the person and a body-part segmentation mask of the person.

19. The one or more non-transitory computer-readable storage media as described in claim 16, wherein the candidate appearance flow maps are computed at least partially based on the prior data describing the body-part segmentation masks.

20. The one or more non-transitory computer-readable storage media as described in claim 19, wherein the conditional segmentation mask is predicted at least partially based on the prior data.

* * * * *